United States Patent
Hell et al.

(10) Patent No.: US 12,467,827 B2
(45) Date of Patent: Nov. 11, 2025

(54) TEST STAND FOR THE POWERTRAIN OF A MOTOR VEHICLE

(71) Applicant: ZF Friedrichshafen AG, Friedrichshafen (DE)

(72) Inventors: Christian Hell, Untergriesbach (DE); Thomas Dollinger, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 255 days.

(21) Appl. No.: 18/552,069

(22) PCT Filed: Mar. 18, 2022

(86) PCT No.: PCT/EP2022/057182
§ 371 (c)(1),
(2) Date: Sep. 22, 2023

(87) PCT Pub. No.: WO2022/200216
PCT Pub. Date: Sep. 29, 2022

(65) Prior Publication Data
US 2024/0175782 A1   May 30, 2024

(30) Foreign Application Priority Data
Mar. 23, 2021   (DE) .................... 10 2021 202 818.7

(51) Int. Cl.
*G01M 15/02*   (2006.01)
(52) U.S. Cl.
CPC .................................. *G01M 15/02* (2013.01)
(58) Field of Classification Search
CPC ... G01M 15/02; G01M 17/007; G01M 13/025
See application file for complete search history.

(56) References Cited

U.S. PATENT DOCUMENTS 4,092,855 A * 6/1978 Kinney ............... G01M 15/044
73/862.12
6,651,493 B2 * 11/2003 Myers ................. G01M 13/025
73/116.05
(Continued)

FOREIGN PATENT DOCUMENTS

DE   41 36 508 A1   5/1993
DE   43 28 537 A1   3/1995
(Continued)

OTHER PUBLICATIONS

European Patent Office, International Search Report issued in International application No. PCT/EP2022/057182 (Jun. 30, 2022).
(Continued)

*Primary Examiner* — Freddie Kirkland, III
(74) *Attorney, Agent, or Firm* — Finch & Maloney PLLC

(57) ABSTRACT

A test stand for a powertrain of a motor vehicle includes at least one loading motor with a motor housing and a motor shaft, at least one load sensor, and at least one positioning module. The motor shaft is configured to be drivingly connected to a hub of the motor vehicle and the load sensor is configured to detect a load transmitted from the motor shaft to the hub. An axial side of the motor housing facing toward the hub is connected rotationally fixed to the at least one positioning module. The motor shaft can be hollow, where a shaft inserted through the hollow shaft can be connected rotationally fixed directly or indirectly to the hub. The load sensor is on an axial side of the motor housing facing away from the hub, and the hollow shaft can be drivingly connected to the shaft by way of the load sensor.

17 Claims, 4 Drawing Sheets

(56) References Cited

U.S. PATENT DOCUMENTS

| | | |
|---|---|---|
| 7,104,118 B2 | 9/2006 | Tentrup et al. |
| 9,109,973 B2 | 8/2015 | Inhoff et al. |
| 2002/0005074 A1* | 1/2002 | Myers ................ G01M 13/025 73/862 |
| 2012/0067140 A1 | 3/2012 | Rossi |
| 2024/0230467 A1* | 7/2024 | Hell ................... G01M 13/025 |

FOREIGN PATENT DOCUMENTS

| | | |
|---|---|---|
| DE | 10 2007 048 530 A1 | 4/2009 |
| EP | 2 924 857 A1 | 9/2015 |

OTHER PUBLICATIONS

European Patent Office, Written Opinion issued in International application No. PCT/EP2022/057182 (Jun. 30, 2022).

German Patent Office, German Search Report issued in German application No. 10 2021 202 818.7 (Nov. 30, 2021).

* cited by examiner

TEST STAND FOR THE POWERTRAIN OF A MOTOR VEHICLE

RELATED APPLICATIONS

This application claims the benefit under 35 U.S.C. § 371 as a U.S. National Phase Application of Application no. PCT/EP2022/057182, filed on 18 Mar. 2022, which claims benefit of German Patent Application no. 10 2021 202 818.7 filed 23 Mar. 2021, the contents of which are hereby incorporated herein by reference in their entireties.

FIELD OF THE DISCLOSURE

The invention relates to a test stand for a powertrain of a motor vehicle.

BACKGROUND

Transmission test stands or powertrain test stands for testing motor vehicle transmissions or complete motor vehicle powertrains are known from the prior art. Such test stands are usually used for quality control, in order to recognize functional defects in powertrains at an early stage by means of a series of loading tests. Typical functional defects occur, for example, in components affected by play, such as gearwheels, synchronizer rings, synchronizer bodies, disk clutch disks and shafts, which are deflected and can be excited into vibrations. Within the framework of such function testing, as a rule the acoustic behavior and the shifting quality are also tested. Furthermore however, such test stands are also used in the development and continual improvement of motor vehicle powertrains.

In this connection DE 43 28 537 C2 describes a transmission test stand with a first servomotor that serves as a drive motor and a second servomotor that serves as a braking motor. The drive motor is connected via a clutch to the drive input shaft of a motor vehicle transmission to be tested and is controlled by a PC, among other things, in relation to its rotation speed so that any desired rotation speed variations can be simulated. The braking motor is connected via a further clutch to a drive output shaft of the motor vehicle transmission to be tested. The rotation speed of the braking motor is also controlled by the PC. The rotation speed variations simulated by the PC are rotation speed variations measured in real driving tests. Thus, in accordance with DE 43 28 537 C2 the motor vehicle transmission can be tested before it is installed in a motor vehicle.

DE 103 28 461 A1 discloses a vehicle test stand with a loading machine for every drivable wheel of a motor vehicle. In this case the loading machines are connected to the rims of the motor vehicle wheels either directly, for example, by means of wheel bolts, or indirectly, for example, by way of a belt drive, so that the loading machines can both drive and brake the powertrain. The vehicle test stand of DE 103 28 461 A1 also comprises a frame structure by means of which the motor vehicle and the loading machines can be raised and aligned relative to one another. During the testing process the motor vehicle is supported completely by the frame structure, so that the vehicle wheels do not make contact with the ground.

SUMMARY

However, the known vehicle test stands have the disadvantage, particularly when they are provided for testing a powertrain already built into the motor vehicle, that they occupy a comparatively large accommodation area and, above all, they require an elaborate and expensive mechanical supporting structure.

A purpose of the present invention is to propose an improved test stand for a powertrain of a motor vehicle.

According to the invention, this objective is achieved by the test stand for a powertrain of a motor vehicle as disclosed herein. Advantageous design features will be apparent in light of the present disclosure.

The invention relates to a test stand for a powertrain of a motor vehicle, comprising at least one loading motor with a motor housing and a motor shaft, at least one load sensor and at least one positioning module, wherein the motor shaft is designed to be drivingly connected to a hub of the motor vehicle and wherein the load sensor is designed to determine a load transmitted from the motor shaft to the hub. The test stand according to the invention is characterized in that an axial side of the motor housing facing toward the hub and the at least one positioning module are designed to be connected rotationally fixed to one another, the motor shaft is in the form of a hollow shaft, a shaft inserted through the hollow shaft is designed to be connected directly or indirectly rotationally fixed to the hub, the load sensor is arranged on an axial side of the motor housing facing away from the hub, and the hollow shaft can be drivingly connected to the shaft by way of the load sensor.

Thus, the invention describes a test stand which is suitable for testing a powertrain of a motor vehicle. The motor vehicle can equally well be a motor vehicle driven by an electric motor or a conventionally powered motor vehicle.

For this purpose, the test stand comprises at least one loading motor with a motor housing and a motor shaft. The loading motor is advantageously an electric motor. Compared with internal combustion engines, electric motors have a comparatively compact structure, they have a broad spectrum of rotation speeds, and advantageously, they deliver the maximum torque over a wide rotation speed range. Only upon reaching the so-termed "corner point" in the high rotation speed range does the torque decrease indirectly proportionally to the further increasing rotation speed, owing to the increasing field weakening.

Preferably, it is provided that the at least one loading motor is in the form of a permanently excited synchronous motor. Particularly advantageously, the synchronous motor has a comparatively large number of magnetic pole pairs, for example twelve or more. Such synchronous motors are also known as so-termed synchro-torque-motors. This has the advantage that the loading motor can be made comparatively compact and short, which consequently results in a location of the center of gravity of the loading motor very close to the chassis of the motor vehicle.

Advantageously, to each loading motor there is assigned an inverter of its own. The inverter is, for example, of three-phase design.

For its part, the at least one loading motor comprises a motor housing by virtue of which the loading motor can be placed on a substrate or a device provided for the purpose. Alternatively, or in addition, the motor housing is also designed to enable the loading motor to be arranged or supported, for example, on its so-termed a-side or b-side.

The motor housing can incorporate a water-cooling system, for example.

Finally, the at least one loading motor also comprises a motor shaft which delivers the torque produced by the loading motor and the rotation speed produced by the loading motor. The motor shaft can be drivingly connected to one of the hubs of the wheels of the motor vehicle, so that a torque and a rotation speed can be transmitted from the motor shaft to the hub. The torque and the rotation speed together constitute a mechanical power, with which the powertrain to be tested can be loaded. Thus, in the context of the test the torque and the rotation speed represent the loading imposed on the powertrain.

In the context of the invention a driving connection is understood to mean a mechanical connection for the transmission of mechanical power, wherein during the transmission the torque and the rotation speed from the loading motor to the hub can be changed. In other words, the loading motor produces, for example, a first rotation speed and a first torque, such that the first rotation speed and the first torque correspond to the first power. During the transmission of the first power the first torque can be changed to a second torque and the first rotation speed to a second rotation speed. However, by virtue of the transmission the first power remains unchanged. Thus, the specification that the motor shaft is or can be drivingly connected to the hub does not establish that there must be a direct mechanical connection, in particular no rotationally fixed connection, between the motor shaft and the hub. Rather, the driving connection can also include a transmission or a single gear ratio step or some other intermediate element.

Furthermore, the test stand comprises at least one load sensor, the said load sensor being designed to detect a load transmitted from the motor shaft to the hub. This can be a rotation speed, or a torque, or both a rotation speed and a torque, for example.

Preferably it is provided that the at least one load sensor is in the form of a torque sensor and/or a force sensor. Since the rotation speed of the loading motor can also be determined, for example, by way of its control electronic system, particularly the inverter, it is advantageously sufficient to design the load sensor for determining the torque or the force acting by way of a lever. From the known rotation speed and the torque determined in that manner, for example, the power or loading can then be determined.

In addition, the test stand comprises at least one positioning module. The at least one positioning module can be attached rotationally fixed to an axial side of the motor housing facing toward the hub by means of connecting means provided for the purpose, such as a flange connection. Preferably the axial side facing toward the hub is the so-termed a-side of the loading motor. The positioning module is advantageously mounted in place of a vehicle wheel, or like a vehicle wheel, on the hub of the motor vehicle.

Preferably, it is provided that the connection of the positioning module to the motor housing is arranged at an outer radial edge both of the positioning module and of the motor housing, in particular, radially outside an area occupied by the hub of the motor vehicle. In that way the connection can on the one hand support a comparatively larger torque, and on the other hand the hub of the motor vehicle can still be rotatable relative to the motor housing. Since the motor housing and thus the entire loading motor is directly in contact with the positioning module, there is also no need to transmit the torque or the rotation speed to the powertrain by way of a cardan shaft, whereby advantageously a short and hence very rigid connection can be made, so that during the operation of the test stand the occurrence of vibrations of an intensity that would interfere with the testing process can be avoided. A further advantage is that the common center of gravity of the loading motor and the positioning module is very close to the contact point of the positioning module, whereby further undesired effects on the testing behavior of the powertrain can be avoided.

According to the invention it is further provided that the motor shaft is in the form of a hollow shaft and that a shaft inserted through the hollow shaft is provided. In turn this shaft can be connected rotationally fixed, directly or indirectly, to the hub. Finally, the load sensor is arranged on the axial side of the motor housing facing away from the hub, this preferably being the so-termed b-side, and drivingly connects the hollow shaft to the said shaft. Thus, a driving connection can be made, from the hollow shaft via the load sensor to the shaft arranged inside the hollow shaft and finally to the hub of the motor vehicle.

At the same time the loading motor—like the motor vehicle to be tested via its suspension—is supported by means of the positioning module which, for its part, is set up on a substrate where the gravitational force loading it is supported. Relative to the positioning module the substrate can have a particularly high frictional coefficient, in order also to enable large torques to be transmitted from the loading motor to the positioning module.

Furthermore, it can be provided that the at least one positioning module can be connected by frictional or interlocking means with a substrate. For example, the adhesion of the positioning module to the substrate can be increased still more if the positioning module is held fast over its working surface, perhaps by means of a tie-down strap whose ends are firmly attached to the substrate. To improve the adhesion of the positioning module to the substrate still more, the positioning module can also, for example, be held onto the substrate by means of a bolt fixed into the substrate and projecting radially outward into the positioning module.

Thus, the invention describes a very compact test stand for testing a powertrain of a motor vehicle, in which the loading motor can be connected directly to a hub of the motor vehicle without any intermediate shaft.

This has the advantage that the testing space required is comparatively substantially smaller and in particular does not need a bulky and expensive testing frame and no corresponding frame structure in order to hold the motor vehicle and the loading motors and align them with one another. In particular, elaborate and time-consuming orientation or adjustment of the powertrain or the motor vehicle relative to the test stand is no longer necessary. A further important advantage of the invention is that the testing process by means of the test stand according to the invention and in particular also the chassis properties of the motor vehicle to be tested are largely uninfluenced, since during the testing process the motor vehicle to be tested is supported exclusively by the chassis. Thus, chassis-specific properties such as the spring compression properties, steering behavior and similar properties can advantageously be tested in a very realistic manner.

Advantageously, it is provided that for every drivable wheel of the motor vehicle the test stand comprises a loading motor, a load sensor, and a positioning module in each case. Thus, the complete powertrain of the motor vehicle can be tested in one test run.

According to a preferred embodiment of the invention, it is provided that at least one positioning module has a concentric opening through which the hub is accessible from a side facing toward the at least one loading motor. In this case the concentric opening is advantageously at least large enough for the hub of the motor vehicle to be completely accessible. In that way the shaft inserted through the hollow shaft can be connected rotationally fixed directly to the hub. For example, the shaft can have a disk-shaped end-piece with a ring of perforations that corresponds identically to the ring of perforations in the hub. In particular the shaft can be attached rotationally fixed onto the hub first, and then the loading motor with the hollow shaft can be pushed over the shaft. The positioning module with the concentric opening is for example arranged rotationally fixed on the axial side of the loading motor facing toward the hub of the motor vehicle. Likewise, however, other forms of design or arrangement of the at least one positioning module and the shaft are conceivable.

In an alternative preferred embodiment of the invention, it is provided that the at least one positioning module has a radially outer and a radially inner portion wherein the inner portion is held rotatably in the outer portion, such that the inner portion is designed to be connected rotationally fixed to the hub of the motor vehicle and such that the outer portion is designed to be connected rotationally fixed to the axial side of the motor housing facing toward the hub. Thus, in this case the at least one positioning module is made in two parts wherein the radially inner portion of the positioning module can rotate relative to the outer portion, so that in this case as well the at least one loading motor can be attached to the positioning module, namely, to the outer portion thereof. Accordingly, the at least one loading motor can again be supported on the positioning module. However, at the same time the positioning module can in this case be connected to the hub not only by the loading motor—and also by means of the hollow shaft, the load sensor, and the shaft—but by virtue of the inner portion that can rotate relative to the outer portion, it can be connected rotationally fixed directly to the hub. This simplifies assembly of the loading motor on the powertrain of the motor vehicle, since the positioning module can first be fitted to the motor vehicle like a normal vehicle wheel and the motor vehicle with the fitted positioning module can then for example be pushed on and positioned or orientated in a simple manner. Likewise, however, other forms of design or arrangement of the positioning module and the shaft are also conceivable.

In a particularly preferred embodiment of the invention, it is provided that the shaft can be connected rotationally fixed to the inner portion. Since the inner portion is connected rotationally fixed to the hub, in this way a load applied by the loading motor via the shaft can be transmitted to the inner portion of the positioning module and from there, via the hub, passed into the powertrain of the motor vehicle.

According to a very particularly preferred embodiment of the invention, it is provided that the shaft is part of the inner portion of the at least one positioning module. Advantageously, the shaft and the inner portion can even be made integrally. Thus, for example, during assembly onto the positioning module and on the motor vehicle, the loading motor can be centered and orientated since it is guided in with its hollow shaft over the shaft. The shaft guided by the hollow shaft is then coupled to the load sensor on the b-side of the loading motor, so that there is a driving connection from the loading motor, by way of the load sensor, to the hub.

In a very particularly preferred embodiment of the invention, it is provided that a rotation of the inner portion relative to the outer portion can be blocked. The blocking can be done, for example, by moving bolts or sliders provided for the purpose or by positioning a clamping element, such that any movement of the outer portion relative to the inner portion is blocked. This has the advantage that the motor vehicle can move under its own power and can consequently be positioned and orientated simply for the testing process. For example, at each wheel to be tested a positioning module that can correspondingly be blocked can be fitted and then the motor vehicle can drive within the testing site, such as a large shed, from the place where the positioning module was fitted to the testing location.

According to a further preferred embodiment of the invention, it is provided that a pneumatic tire is fitted on the at least one positioning module. In that case the supporting behavior of the positioning module on the substrate corresponds very largely to the supporting behavior obtained during normal driving operation of the motor vehicle. This can improve the quality of the test, since the behavior of the powertrain in the testing situation is even more like the behavior of the powertrain during normal driving operation of the motor vehicle. Preferably a pneumatic tire is fitted on the positioning module, which tire is also appropriate for when the motor vehicle is operated in road traffic.

In an alternative preferred embodiment of the invention, it is provided that a rubber coating is arranged on the at least one positioning module. The rubber coating also enables a comparatively realistic supporting of the positioning module on the substrate, but in contrast to the pneumatic tire does not require any separate selection and fitting of a respectively suitable pneumatic tire on the positioning module. Instead, the rubber layer can be arranged firmly and permanently on the positioning module.

According to a further preferred embodiment of the invention, it is provided that the hollow shaft has a rotary lead-through for the introduction of a coolant, and flow ducts for the coolant to flow through the hollow shaft. Thus, during the operation of the loading motor the rotor can be cooled from the inside.

In a further preferred embodiment of the invention, it is provided that radially between the hollow shaft and the shaft, at least two axially separated bearings are arranged in order to absorb transverse or axial forces. In this way it can be ensured that, in particular, the gravitational weight of the at least one loading motor is supported by the bearings provided for the purpose and does not act upon the load sensor. Thus, the load sensor is acted upon exclusively by a torque to be detected, which in turn benefits its measuring accuracy. The bearings serve exclusively to absorb the transverse and axial forces, since no relative rotation takes place between the shaft and the hollow shaft.

According to a further preferred embodiment of the invention it is provided that the test stand also comprises at least one motor support, which is designed to oppose a tilting movement of the at least one loading motor. Since the loading motor is connected to the positioning module only on one axial side, preferably the a-side, and is held exclusively by the positioning module, a tilting torque acts upon the loading motor which, owing to the proximity of the common center of gravity of the loading motor and the positioning module to the contact area of the positioning module, which although the said torque is comparatively small, can still have an unfavorable influence on the testing. This tilting torque is advantageously opposed by the motor support. The motor support can be, for example, arranged in the area of the axial side of the motor housing facing away from the hub, preferably the b-side of the motor housing, underneath the motor housing, in order to support the loading motor from below. Likewise, it is conceivable to attach the motor support in such manner that it holds the loading motor from above, i.e., so that the loading motor is suspended from the motor support. In the latter case the motor support can inexpensively and simply be in the form of a rope, in particular a wire cable.

If the motor support is holding the loading motor from above, it can in particular comprise a compensation element which is arranged in the power flow and, for its part, comprises a spring that can be prestressed. By virtue of an adjustable prestressing of the spring, it is advantageously possible to set a compensating tilting torque or a compensating force that corresponds to the tilting torque. In that way it can be ensured that there is no overcompensation of the tilting torque.

According to a further preferred embodiment of the invention, it is provided that the test stand also comprises at least one supporting prop, such that the supporting prop can be adjusted in three spatial directions and/or can be rotated about three axes, and such that it is designed to support the positioning module, or that the test stand also comprises at least one hexapod-like actuator device, the said actuator device being designed to adjust the hub in three spatial directions and/or to rotate it about three axes. By appropriate actuation of the supporting prop, for example along a vertical axis, any unevenness of the ground during the driving of the motor vehicle can be simulated. Likewise, almost any other influences of a possible substrate can also be simulated by the supporting prop, particularly also in connection with steering movements of steered wheels of the motor vehicle. The hexapod-like actuator device preferably acts upon the hub of the motor vehicle and is also capable of simulating unevenness of the ground during the driving and almost any other influences of a possible substrate. As its name already suggests, the hexapod-like actuator device comprises six actuators, for example in the form of hydraulic cylinders. This enables particularly realistic testing of the powertrain.

BRIEF DESCRIPTION OF THE DRAWINGS

Below, example embodiments of the invention are explained with reference to the figures, which show.

The same objects, functional units and comparable components are denoted by the same indexes in all the figures. These objects, functional units and comparable components are designed identically as regards their technical characteristics unless indicated explicitly or implicitly in the description.

DETAILED DESCRIPTION

Figure 1:
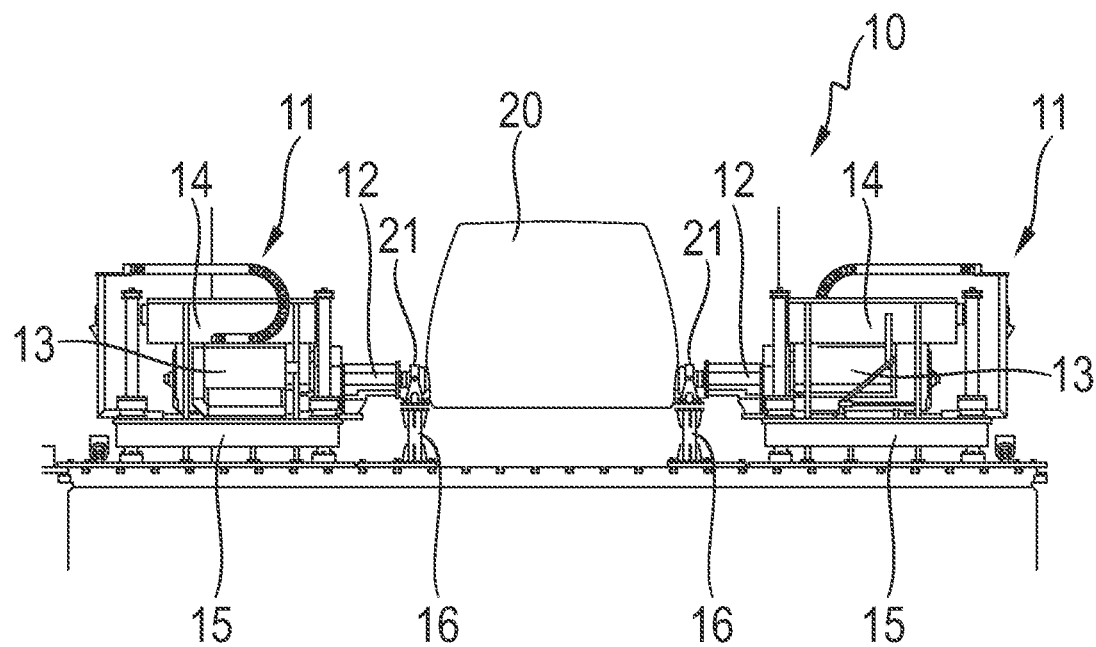
FIG. 1: As an example, and represented schematically, a test stand known from the prior art for testing a powertrain of a motor vehicle, and the vehicle to be tested.

FIG. 1 shows, as an example and represented schematically, a test stand 10 known from the prior art for testing a powertrain of a motor vehicle 20, and the vehicle 20 to be tested. The powertrain is in this case completely built into the motor vehicle 20. The known test stand 10 comprises two loading units 11, which are each connected by way of respective connecting shafts 12 to hubs 21 of drivable wheels of the motor vehicle 20. However, for all-wheel vehicles it is known to have four loading units 11 of the same type. For their part the loading units 11 each comprise a terminal box 14 attached to the respective electric drive motor 13 for receiving the cables, which supply the electric drive motors 13 with electrical energy. The drive motors are in each case arranged on a frame rack 15, and the frame rack 15 can be adjusted laterally so as to be able to adapt to the track width of different types of vehicles. The motor vehicle 20 is usually lifted by means of a lifting device, such as a crane, onto the supporting elements 16 and deposited there. The supporting elements 16 in each case comprise a receiving bearing for fixing to the hubs of the vehicle wheels.

The structure of and hence the space occupied by the known test stand 10 are comparatively large. Since no wheels are fitted on the hubs 21 of the motor vehicle 20, the vehicle 20 can neither move under its own power nor be pushed to the testing position on the test stand 10.

Figure 2:
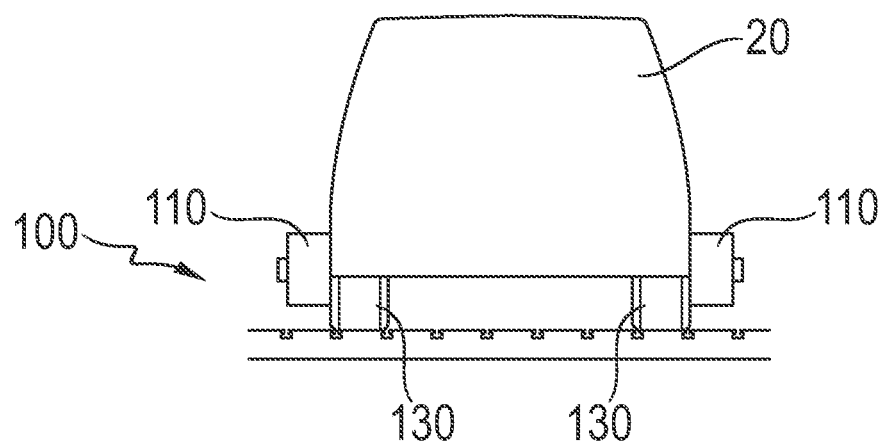
FIG. 2: As an example, and represented schematically, a possible embodiment of a test stand according to the present invention for a powertrain of a motor vehicle, and the vehicle to be tested.

FIG. 2 shows, as an example and represented schematically, a possible embodiment of a test stand 100 according to the invention for a powertrain of a motor vehicle 20, as well as the motor vehicle 20 to be tested. As can be seen, the test stand 100 according to the invention comprises two loading motors 110 which can be arranged directly on the hubs 21 (not shown in FIG. 2) of the motor vehicle 20. Consequently, compared with the known test stand 10 the test stand 100 according to the invention is much more compact, and less expensive. In particular, no elaborate orientation of loading unit 11 or loading motors 110 relative to the motor vehicle 20 is necessary. Furthermore, by virtue of the test wheels 130 the motor vehicle 20 can move to the necessary test position under its own power. It is also particularly advantageous that thanks to its structure the test stand 100 according to the invention does not need a bulky frame rack 15.

Figure 3:
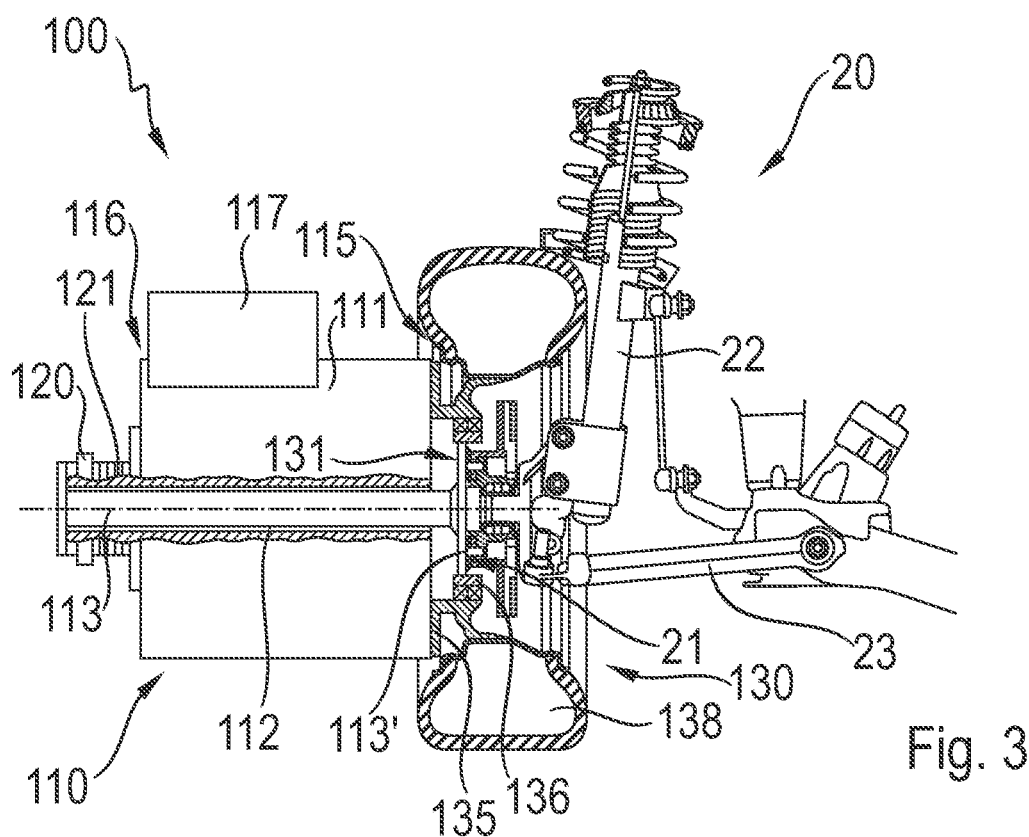
FIG. 3: As an example, and represented schematically, a possible embodiment of a test stand according to the invention, in detail.

FIG. 3 shows, as an example and represented schematically, a possible embodiment of a test stand 100 according to the invention, in detail. In can be seen that the loading motor 110 in the form of an electric motor 110 comprises a motor housing 111 and a motor shaft 112 in the form of a hollow shaft 112. In this example the electric motor 110 or loading motor 110 is a permanently excited synchronous torque motor 110 with a liquid-cooled motor shaft 112. In this example the motor shaft 112 in the form of a hollow shaft 112 has a rotary lead-through (not shown in FIG. 3) into which glycol can be introduced as the coolant. By way of bores (also not shown) in the hollow shaft 112 glycol flows through the hollow shaft and cools it. The synchrotorque motor is in the form of a synchronous motor and in this example comprises 12 permanent-magnetic pole pairs. This comparatively large number of pole pairs enables the loading motor 110 to produce a comparatively very high torque even when energized with comparatively small currents. Moreover, this structure has the advantage that the loading motor 110 has a comparatively large radial width compared with its axial length. Such electric motors are also called so-termed "torque motors." In this example an inverter 117 is arranged directly on the motor housing 111. Alternatively, however, the inverter 117 can also be arranged a distance away from the motor housing 111. Also, to be seen is a load sensor 120 in the form of a torque sensor 120, and a positioning module 130. The load sensor 120 is in this case arranged on an axial side 116 of the loading motor 110 facing away from the hub 21, namely on the so-termed b-side of the loading motor 110. The loading motor 110, the load sensor 120 and the positioning module 130 together form a possible embodiment of the test stand 100 according to the invention. Seen only in part is the motor vehicle 20 of which in FIG. 3, for greater clarity, only a hub 21, a vibration damper 22 and a wheel linkage 23 are shown.

As can be seen, a further shaft 113 is inserted through the hollow shaft 112, which has at its end facing toward the hub 21 of the motor vehicle 20 a disk-shaped end-piece 113'. With this disk-shaped end-piece 113', in this example the shaft 113 rests flat against the hub 21 and is connected to the hub 21 by a flange connection. For that purpose, the positioning module 130 has a concentric opening 131 through which the hub 21 is accessible from a side facing toward the loading motor 110. At its end facing away from the hub 21 the shaft 113 is drivingly connected to the load sensor 120 which, for its part, is also drivingly connected to the hollow shaft 112. Thus, there is a driving connection of the motor shaft 112, via the load sensor 120 and the further shaft 113, to the hub 21. Since the hub 21 is a terminal member of the powertrain of the motor vehicle 20, there is also a driving connection to the powertrain of the motor vehicle 20 so that the powertrain can be loaded and tested. Since the load sensor 120 is drivingly arranged between the hollow shaft 112 and the further shaft 113, it can detect a load transmitted from the loading motor 110 to the hub 21, or a torque transmitted to the hub 21. Drivingly between the load sensor 120 and the hollow shaft 112 a compensation clutch 121 is also provided, in order to compensate angular and radial offsets. Furthermore, in this example the loading motor 110, by way of its axial side facing toward the hub 21, namely the so-termed a-side of the loading motor 110, is connected rotationally fixed by a flange connection to the positioning module 130.

In this case the loading motor 110 is connected rotationally fixed to a radially outer portion 135 of the positioning module 130, whereas a radial inner portion 136 is held in the said outer portion 135 and wherein the said inner portion 136 has the concentric opening 131. By virtue of this structure the positioning module 130 is held only indirectly by the loading motor 110 onto the hub 21. During testing operation, the loading motor 110 is supported by the outer portion 135 of the positioning module 130 and can therefore transmit a load into the hub 21. Moreover, a pneumatic tire 138 is fitted onto the positioning module 130. In this example the said pneumatic tire 138 is a pneumatic tire 138 which is also approved for roadway operation of the motor vehicle 20. Since during a testing process the motor vehicle 20 stands on the pneumatic tire 138, the testing procedure of the powertrain of the motor vehicle 20 is very realistic.

Figure 4:
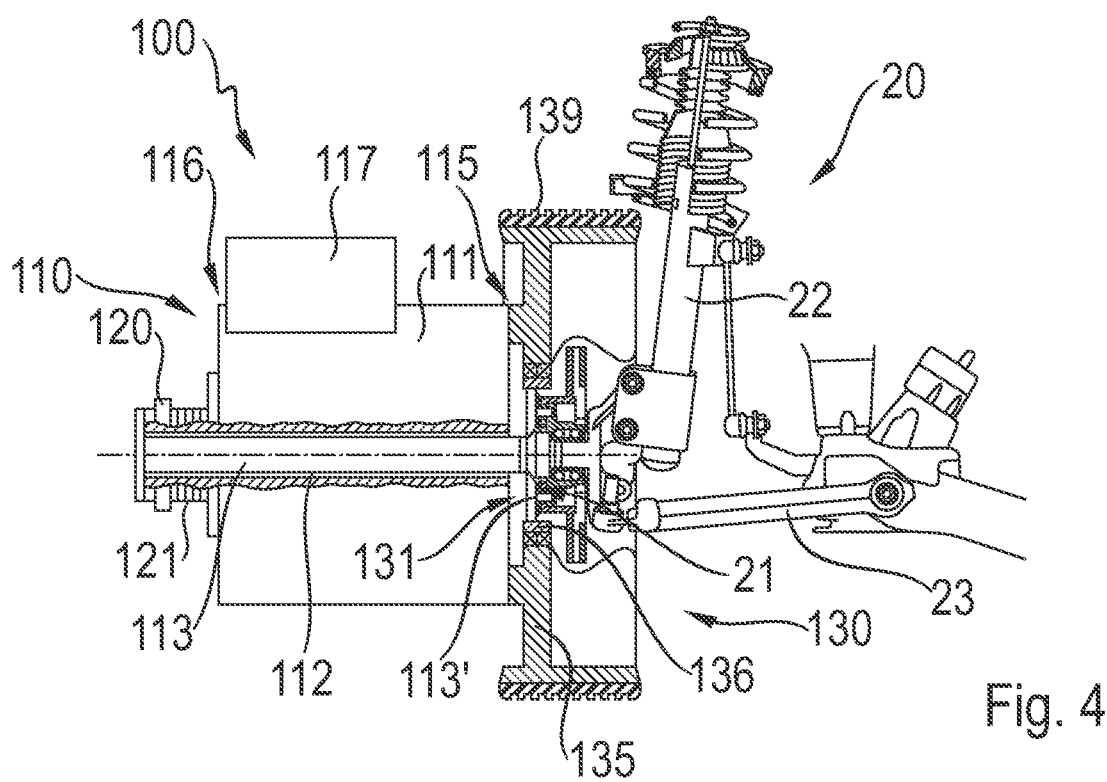
FIG. 4: As an example, and represented schematically, a further possible embodiment of a test stand according to the invention.

FIG. 4 shows, as an example and schematically, a further possible embodiment of a test stand 100 according to the invention. The test stand 100 of FIG. 4 differs from the test stand of FIG. 3 in the structure of the positioning module 130. In this example, instead of a pneumatic tire 138 on the positioning module 130 a rubber coating 139 is applied thereto. The rubber coating 139 also enable a comparatively realistic supporting of the positioning module 130 on a substrate, but in contrast to the pneumatic tire 138 it does not require any separate selection and fitting of a respectively suitable pneumatic tire 138 on the positioning module 130. Instead, the rubber coating 139 can be arranged firmly and permanently on the positioning module 130.

Figure 5:
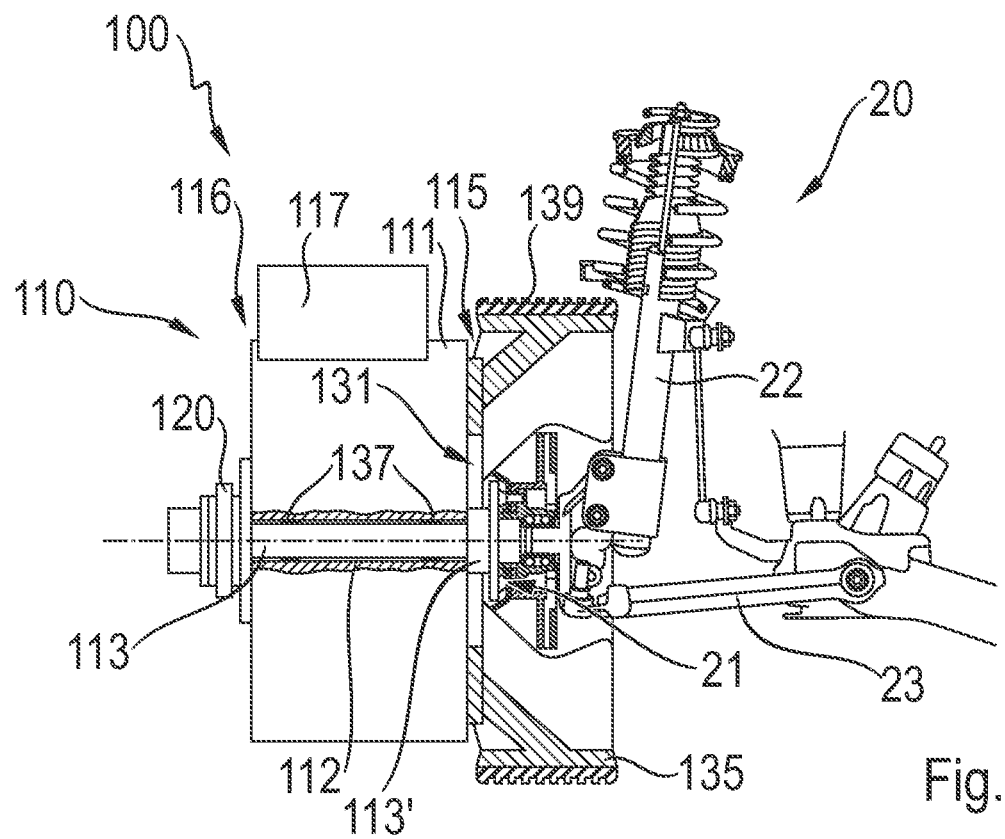
FIG. 5: As an example, and represented schematically, still another possible embodiment of a test stand according to the invention.

FIG. 5 shows, as an example and schematically, still another possible embodiment of a test stand 100 according to the invention. The test stand 100 of FIG. 5 again differs from the test stand 100 of FIG. 4 only in the structure of the positioning module 130. In this example the positioning module 130 has no inner portion 136 which would be held rotatably in the radially outer portion 135. Instead, the positioning module 130 of FIG. 5 has exclusively a concentric opening 131. Furthermore, in the test stand 100 of FIG. 5 it is provided that radially between the hollow shaft 112 and the shaft 113 two axially separated bearings 137 are arranged in order to absorb transverse and axial forces. In that way, transverse forces produced by the gravitational weight of the loading motor can be supported without acting upon the load sensor 120. This improves the measuring accuracy of the load sensor 120.

Figure 6:
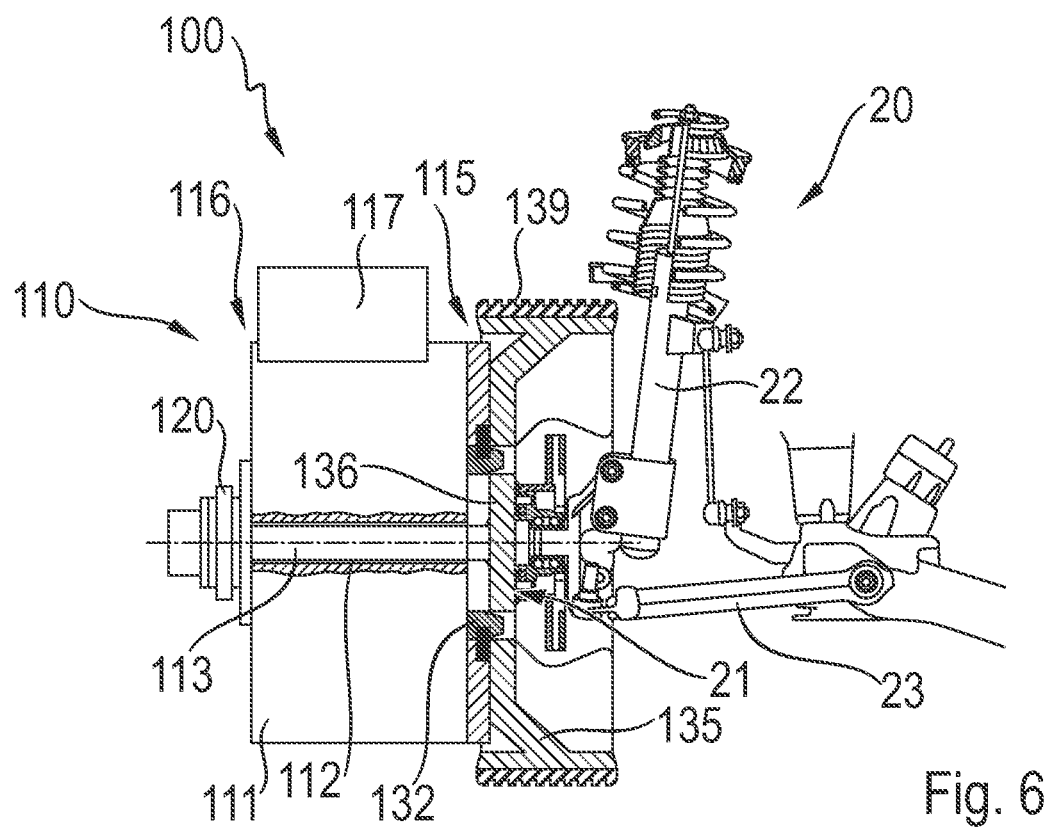
FIG. 6: As an example, and represented schematically, still another possible embodiment of a test stand according to the invention.

FIG. 6 shows, as an example and schematically, yet another possible embodiment of a test stand 100 according to the invention. The test stand 100 of FIG. 6 differs from the test stand 100 of FIG. 3 in the structure of the positioning module 130. In the example embodiment of FIG. 6 the positioning module 130 has a radially outer portion 135 and a radially inner portion 136, such that the inner portion 136 is held by the shaft 113 and the loading motor 110. However, the positioning module 130 does not have a concentric opening 131. Instead, the inner portion 136 of the positioning module 130 is connected rotationally fixed on one side to the hub 21 and on the other side rotationally fixed to the shaft 113. Furthermore the positioning module 130 comprises a blocking device 132 which, in the installed condition of the loading motor 110, enables the inner portion 136 to rotate relative to the outer portion 135 since the outer portion 135 is displaced in the direction of the loading motor 110 and is therefore no longer in a common plane with the inner portion 136, so that the blocking device 132 cannot perform any blocking action between the inner portion 136 and the outer portion 135. Only when the inner portion 136 and the outer portion 135 together with the blocking device 132 are in one plane does the blocking device 132 block any rotation. This has the advantage that the motor vehicle 20 can move under its own power and can accordingly be positioned and orientated for the test in a simple manner.

Figure 7:
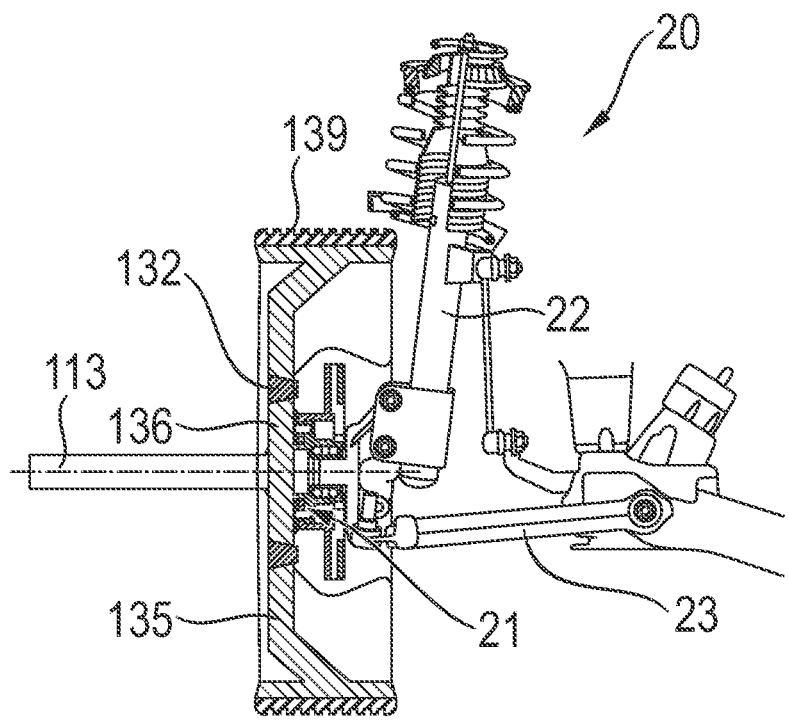
FIG. 7: As an example, and represented schematically, a possible embodiment of a test stand according to the invention.

FIG. 7 shows, as an example and schematically, a possible embodiment of a positioning module 130 according to the invention for a test stand 100. The positioning module 130 of FIG. 7 differs from the positioning module 130 of FIG. 6 in that the blocking device 132 is shown in its blocking condition since the loading motor 110 (not shown in FIG. 7) is not mounted on the shaft 113. In this condition the motor vehicle 20 can move under its own power since the inner portion 136 cannot rotate relative to the outer portion 135.

Figure 8:
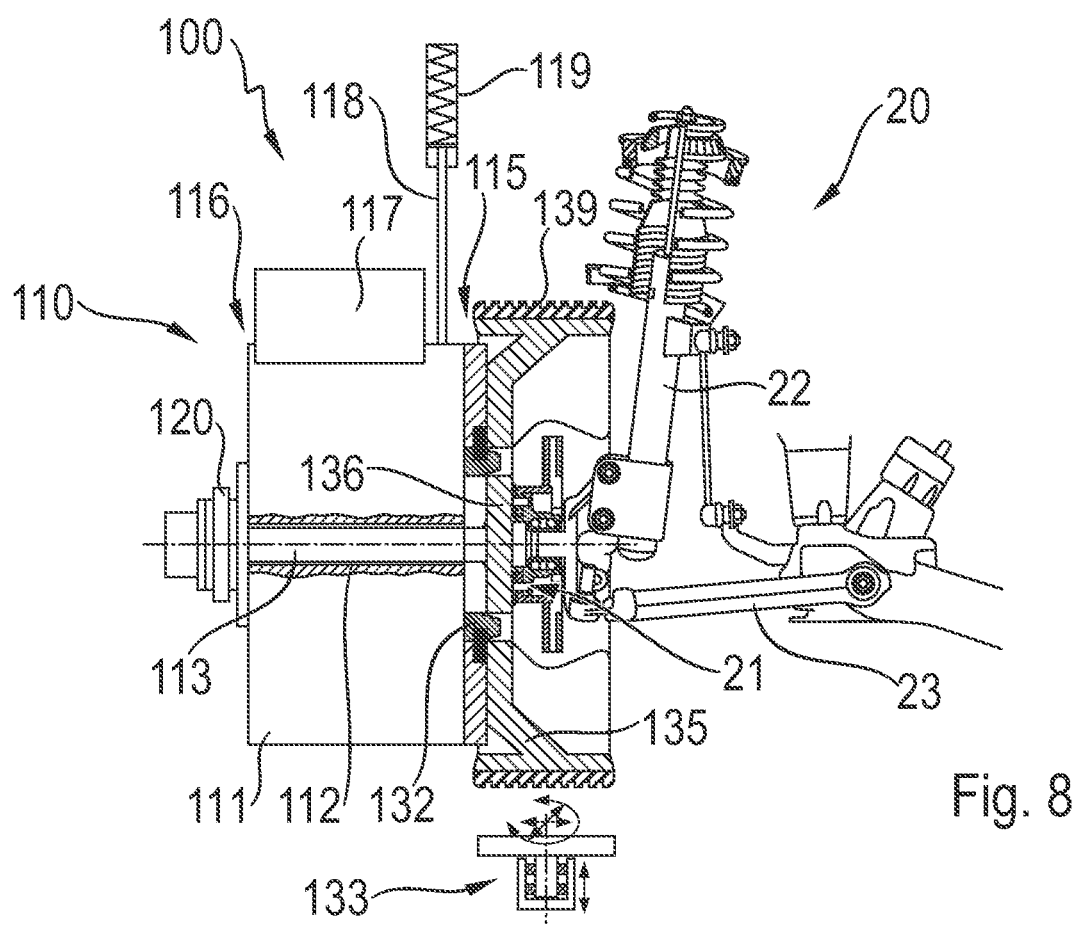
FIG. 8: As an example, and represented schematically, yet another possible embodiment of a test stand according to the invention.

FIG. 8 shows, as an example and schematically, yet another possible embodiment of a test stand 100 according to the invention. The test stand 100 of FIG. 8 differs from the test stand 100 of FIG. 6 on the one hand by the presence of a motor support 118 which engages with the motor housing 111 from above and opposes a tilting torque of the loading motor 110, which would otherwise have to be supported at the positioning module 130. For example, the motor support 118 is a wire cable 118 fixed to a suitable structure above the test stand 100. In this example the motor support 118 also comprises a compensation element 119 containing a spring that can be prestressed and which exactly opposes the tilting torque of the loading motor 110 by virtue of an adjusted prestress. On the other hand, the test stand 100 of FIG. 8 also differs from the test stand 100 of FIG. 6 by the presence of a supporting prop 133 which can be adjusted in three spatial directions and rotated about three axes (in each case represented by arrows). During the testing process the positioning module 130 can be supported on the supporting prop 133. By appropriately actuating the supporting prop 133 during the testing process, for example ground unevenness during the driving of the motor vehicle 20 can be simulated. Likewise, almost any other influences of a possible substrate can be simulated, particularly also in connection with steering movements of the steerable wheels of the motor vehicle 20.

Indexes

10 Test stand
11 Loading unit
12 Connecting shaft
13 Drive motor
14 Terminal box
15 Frame rack
16 Supporting element
20 Motor vehicle
21 Hub
22 Vibration damper
23 Wheel deflection
100 Test stand
110 Loading motor, electric motor, permanently excited synchronous motor
111 Motor housing
112 Motor shaft, hollow shaft
113 Shaft
113' Disk-shaped end piece
115 Axial side facing toward the hub
116 Axial side facing away from the hub
117 Inverter
118 Motor support, wire cable
119 Compensation element
120 Load sensor, torque sensor
121 Clutch
130 Positioning module
131 Concentric opening
132 Blocking device
133 Supporting prop
135 Radially outer portion
136 Radially inner portion
137 Bearing
138 Pneumatic tire
139 Rubber coating

The invention claimed is:

1. A test stand for a powertrain of a motor vehicle, the test stand comprising:
at least one loading motor with a motor housing and a motor shaft;
at least one load sensor;
at least one positioning module, wherein the motor shaft is configured to be drivingly connected to a hub of the motor vehicle and wherein the load sensor is configured to detect a load transmitted from the motor shaft to the hub;
wherein:
an axial side of the motor housing facing toward the hub and the at least one positioning module are configured to be connected rotationally fixed to one another;
the motor shaft is in the form of a hollow shaft;
a shaft inserted through the hollow shaft is configured to be connected rotationally fixed directly or indirectly to the hub;
the load sensor is arranged on an axial side of the motor housing facing away from the hub; and
the hollow shaft can be drivingly connected to the shaft by way of the load sensor.

2. The test stand according to claim 1, wherein the at least one positioning module has a concentric opening through which the hub is accessible from a side facing toward the at least one loading motor.

3. The test stand according to claim 1, wherein the at least one positioning module comprises a radially outer portion and a radially inner portion, wherein the inner portion is held and can rotate in the outer portion, wherein the inner portion is configured to be connected rotationally fixed to the hub of the motor vehicle, and wherein the outer portion is configured to be connected rotationally fixed to the axial side of the motor housing facing toward the hub.

4. The test stand according to claim 3, wherein the shaft is connected rotationally fixed to the inner portion.

5. The test stand according to claim 4, wherein the shaft is part of the inner portion of the at least one positioning module.

6. The test stand according to claim 3, wherein a rotation of the inner portion relative to the outer portion can be blocked.

7. The test stand according to claim 1, further comprising a pneumatic tire fitted onto the at least one positioning module.

8. The test stand according to claim 1, further comprising a rubber coating on the at least one positioning module.

9. The test stand according to claim 1, wherein the at least one positioning module is configured to be connected to the substrate by friction force or with interlock.

10. The test stand according to claim 1, wherein the at least one loading motor is in the form of a permanently excited synchronous motor.

11. The test stand according to claim 1, wherein the hollow shaft has a rotary lead-through for the introduction of a coolant and flow ducts for the coolant to flow through the hollow shaft.

12. The test stand according to claim 1, comprising at least two bearings positioned radially between the hollow shaft and the shaft and spaced axially a distance apart, the at least two bearings configured to absorb axial and/or transverse forces.

13. The test stand according to claim 1, wherein the at least one load sensor is in the form of a torque sensor and/or a force sensor.

14. The test stand according to claim 1, comprising at least one motor support configured to oppose a tilting movement of the at least one loading motor.

15. The test stand according to claim 1, comprising at least one supporting prop, the supporting prop configured to be adjusted in three spatial directions and/or rotated about three axes, wherein the supporting prop is configured to support the positioning module.

16. The test stand according to claim 1, wherein for each drivable wheel of the motor vehicle the test stand has a respective loading motor, a respective load sensor, and a respective positioning module.

17. The test stand according to claim 1, comprising a hexapod-like actuator device configured to adjust the hub in three spatial directions and/or to rotate it about three axes.

* * * * *